United States Patent
Gardner

(10) Patent No.: US 7,095,058 B2
(45) Date of Patent: Aug. 22, 2006

(54) SYSTEM AND METHOD FOR AN IMPROVED LIGHT-EMITTING DEVICE

(75) Inventor: Donald S. Gardner, Mountain View, CA (US)

(73) Assignee: Intel Corporation, Santa Clara, CA (US)

(*) Notice: Subject to any disclaimer, the term of this patent is extended or adjusted under 35 U.S.C. 154(b) by 197 days.

(21) Appl. No.: 10/393,643

(22) Filed: Mar. 21, 2003

(65) Prior Publication Data

US 2004/0183087 A1 Sep. 23, 2004

(51) Int. Cl.
*H01L 33/00* (2006.01)

(52) U.S. Cl. .................. 257/98; 257/81; 257/91; 257/99; 257/100; 257/101; 257/102; 257/103

(58) Field of Classification Search .............. 257/81, 257/91, 98, 99, 100, 101, 102, 103
See application file for complete search history.

(56) References Cited

U.S. PATENT DOCUMENTS

| 3,868,589 | A |   | 2/1975 | Wang |          |
|-----------|---|---|--------|------|----------|
| 5,249,195 | A | * | 9/1993 | Feldman et al. | 372/45 |
| 5,852,346 | A | * | 12/1998 | Komoda et al. | 315/169.3 |
| 6,017,773 | A | * | 1/2000 | Fauchet et al. | 438/22 |
| 2002/0017657 | A1 | * | 2/2002 | Coffa et al. | 257/200 |

FOREIGN PATENT DOCUMENTS

| EP | 0 511 779 A2 | 11/1992 |
| JP | 2001203382 | 7/2001 |

OTHER PUBLICATIONS

E. Murphy et al., "Fabrication and Characterization of Narrow–Band Bragg–Reflection Filters in Silicon–on–Insulator Ridge Waveguide", Journal of Lightwave Technology, IEEE 2001, pp. 1938–1942.
P. G. Kik et al., "Gain limiting proces in Er–doped Si nanocrystal waveguides in SiO2", Journal of Applied Physics, vol. 91 No. 1, Jan. 2001, pp. 534–536.
S. Tanabe et al., "Improved Flourescence for Tm–Ho and Tm–H0–Eu–Codoped Transparent PbF2 Glass–Ceramics for S+–Band Amplifiers", Journal of the American Ceramics, vol. 85, No. 4, Apr. 2002, pp. 839–843.
Giorgia Franzo, et al., "Er(3+) ions–Si Nanocrystals Interactions and Their Effects on the Luminescence Properties," Applied Physics Letters, American Institute of Physics, Apr. 17, 2000, pp. 2167–2169, vol. 76.
No. 16, XP.012025056.
P.G. Kik and A. Polman, "Excition–Erbium Energy Transfer in Si Nanocrystal–Doped SiO2," Materials Science and Engineering B, Apr. 24, 2001, pp. 3–8, vol. 81, No. 1–3, XP:004234597, Elsevier Science S.A.
S. O'Brien, et al., "High–Power GainAs Lasers with Distributed Bragg Reflectors," Proceedings of the Optical Fiber Communication Conference in San Jose, IEEE, Feb. 2–7 1992, XP:00034151.
A. Polman, "Miniature Erbium Doped Planar Optical Amplifiers," Proceedings of the 27th Conference on Optical Communication 2001, Sep. 30, 2001, pp. 632–633, vol. 4, XP: 010582715.

* cited by examiner

*Primary Examiner*—Minhloan Tran
*Assistant Examiner*—Tan Tran
(74) *Attorney, Agent, or Firm*—Philip A. Pedigo

(57) ABSTRACT

The improved light-emitting device may include a waveguide made with Si nanocrystals doped with optically active elements. The improved light-emitting device may be suitable for use in chip-to-chip and on-chip interconnections.

32 Claims, 8 Drawing Sheets

SYSTEM AND METHOD FOR AN IMPROVED LIGHT-EMITTING DEVICE

TECHNICAL FIELD

Embodiments of the invention relate to light-emitting devices and to optical communications systems employing light-emitting devices.

BACKGROUND

Modern computing devices include a variety of different types of integrated circuit (IC) chips including processors, memory devices, and controllers. On-chip and chip-to-chip interconnections within a computer are typically made with metal wires. As IC chips become more integrated, the wires become narrower and more closely spaced. This results in a higher resistance in the wires and a higher capacitance between the wires. The increase in resistance and capacitance may degrade electrical signals traveling through the wires. This signal degradation may reduce the performance of IC chips and the computing device as a whole.

To solve this problem, on-chip and chip-to-chip optical interconnections using light sources and waveguides have been proposed. In an optical interconnection system, an electrical signal from the IC chip is converted to an optical signal emitted by a light source. The light then travels over a waveguide to a detector, which converts the received light back to an electrical signal. The speed of the light in an optical interconnection is faster than the flow of electrons in a wire and scales linearly with the length of the optical interconnection. Also, optical interconnections can consume less electrical power than electrical interconnections as the interconnections become long.

Conventional optical interconnection systems generally require a light source that is not integrally formed with the IC chip. This is because Si and SiGe, the materials typically used to form IC chips, have not been considered suitable for forming integral light sources because they have an indirect band gap. Instead, external light sources made from direct band gap semiconductors are typically used in conventional optical interconnection systems. These light sources are separately packaged and aligned to the waveguide, as well as to other devices on the IC chip. This makes for a relatively expensive and complicated on-chip or chip-to-chip optical communication system.

Further complicating chip-to-chip communications is the limited number of contact pads that can be fabricated onto an IC chip. As IC chips increase in sophistication, more and more input/output leads are required to accommodate the larger number of bits and inputs/outputs for other applications.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to a system and method for an improved light-emitting device and optical communications systems using such a device. Embodiments of the invention consist of a waveguide device made directly on a Si substrate normally used for complementary metal-oxide semiconductor (CMOS) digital circuit technology. These embodiments may be a combination of a waveguide made with Si nanocrystals and other optically active elements (e.g., rare earth elements) within a $SiO_2$ film. The costs associated with fabricating the devices directly on the same substrate are significantly lower than the costs associated with the purchase and assembly of discrete devices. Coupling between the light source and the optical waveguide is simplified because these elements are integrated onto the same monolithic substrate.

A number of elements and compounds are referred to throughout this document. It is recognized that there is some variance in the symbols and names used to identify elements and compounds. Table 1 provides a list of elements, the corresponding atomic numbers for the listed elements, and the abbreviation used throughout this document for the identified element.

TABLE 1

| Element Name | Atomic Number (Z) | Abbreviation |
| --- | --- | --- |
| Silicon | 14 | Si |
| Germanium | 32 | Ge |
| Erbium | 68 | Er |
| Praseodymium | 59 | Pr |
| Holmium | 67 | Ho |
| Ytterbium | 70 | Yb |
| Cerium | 58 | Ce |
| Thulium | 69 | Tm |

Figure 1A:
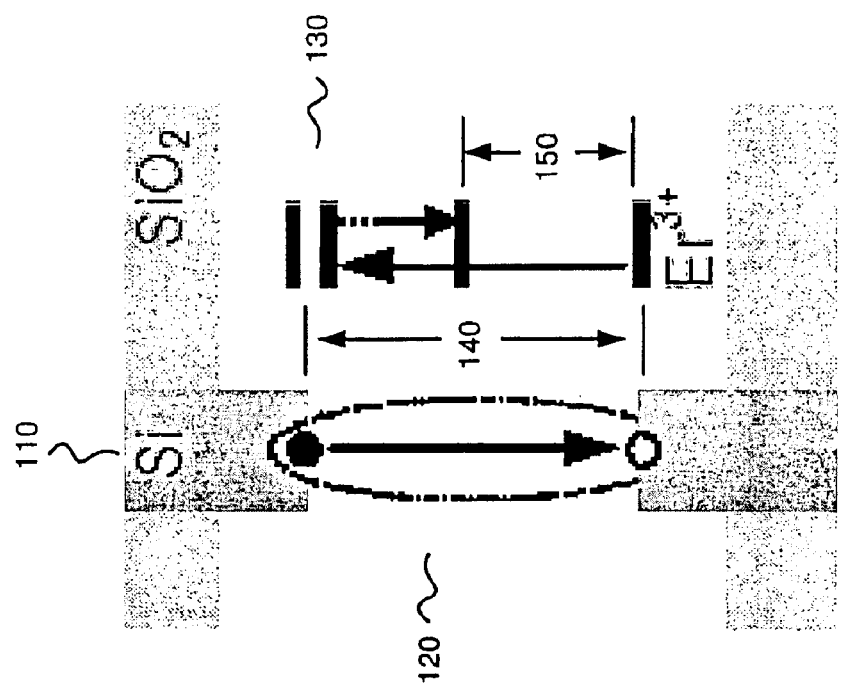
FIG. 1A is a band gap diagram illustrating that an optically active element (e.g., Er) may be excited indirectly using Si nanocrystals.

FIG. 1A is a band gap diagram illustrating that an optically active element (e.g., Er) may be excited indirectly using Si nanocrystals. Si nanocrystal 110 may be optically or electrically excited to generate electron-hole pair 120. Electron-hole pairs (e.g., electron-hole pair 120) may recombine and transfer energy to an $Er^{3+}$ ion (e.g., via an Auger process). For example, when a Si nanocrystal 110 absorbs a photon it is optically excited. The absorbed photon causes the generation of an exciton within Si nanocrystal 110. The exciton may recombine non-radiatively by exciting Er atom 130. Unlike bulk Si, the Auger process is not reversible with Si nanocrystal 110 because band gap 140 is greater than band gap 150.

Figure 1B:
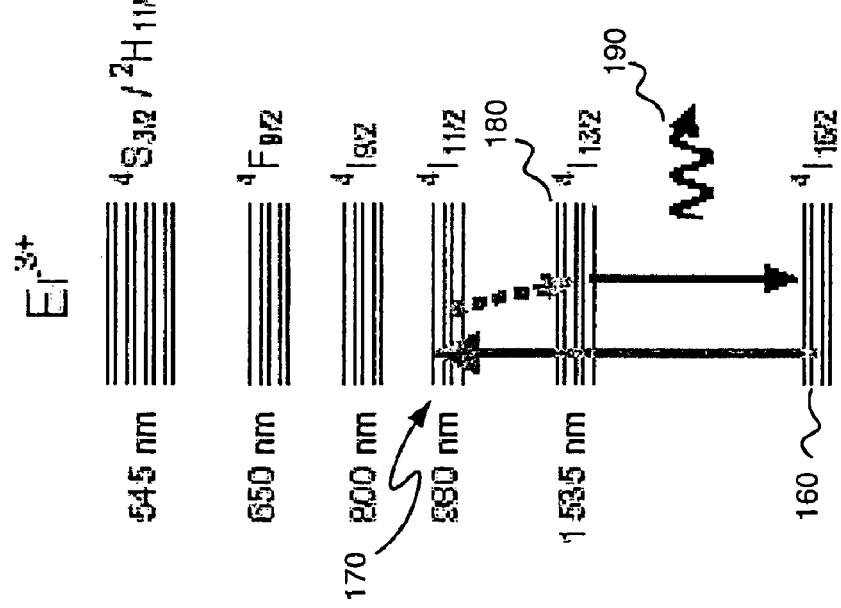
FIG. 1B is a band gap diagram corresponding to Er atom 130.

FIG. 1B is a band gap diagram corresponding to Er atom 130. When Er atom 130 absorbs an Auger electron from Si nanocrystal 110, an inner shell electron of Er atom 130 may temporarily move from energy level 160 to energy level 170. The electron may then move to energy level 180 and dissipate energy thermally without emitting a photon in a process called "relaxation." Finally, the electron may return to lower energy level 160 and Er atom 130 may emit photon 190 to compensate for the change in energy levels of the electron. In the illustrated embodiment, photon 190 has a wavelength of approximately 1.5 μm.

The excitation process illustrated by FIG. 1 is not limited to Er atoms but, instead, is possible with a variety of optically active elements. In particular, atoms of the rare earth elements may be used in conjunction with Si nanocrystals to provide a light-emitting source. The elements from lanthanum (Z=57) through lutetium (Z=71) are known as the rare earth elements. The rare earth elements exhibit similar properties because the differences between electron configurations for these elements occurs mostly in the outer shells. The rare earth elements are also known as the lanthanides or the lanthanoids.

Figure 2:
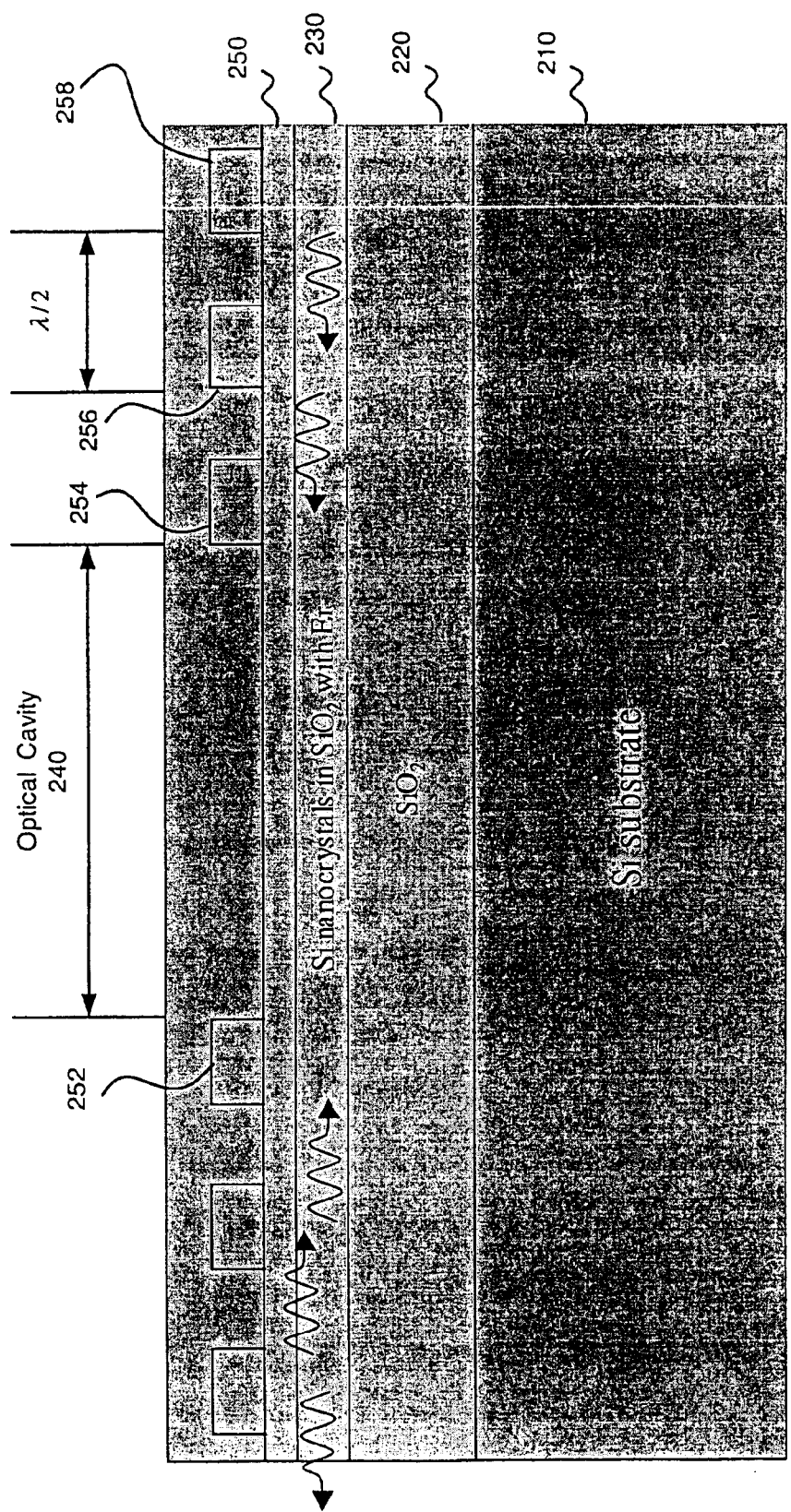
FIG. 2 illustrates light-emitting device 200 implemented in accordance with certain aspects of the invention.

FIG. 2 illustrates light-emitting device 200 implemented in accordance with certain aspects of the invention. Light-emitting device 200 includes substrate 210, dielectric layer 220, optically active layer 230, and optical cavity 240. In some embodiments of the invention, substrate 210 is made of a float-zone semiconductor material. The term float-zone refers to a type of crystal growth in which the growing crystal does not touch the walls of a crucible in which it is growing. Examples of float-zone semiconductor materials include Si, Ge, and SiGe. In the illustrated embodiment of the invention, dielectric layer 220 is composed of $SiO_2$. In alternative embodiments of the invention, dielectric layer 220 may be composed of a different material.

Optically active layer 230 includes Si nanocrystals in close proximity to atoms of an optically-active element (e.g., atoms of a rare earth element). As described above, Si nanocrystals and atoms of an optically-active element may be used as a light source. Optically active layer 230 is a thin layer of Si nanocrystals and atoms of a rare earth element, which together form a light source and a waveguide, in an embodiment of the invention. In an alternative embodiment of the invention, the dielectric can be fluoride or fluorine-doped silicon dioxide. The optically active layer (e.g., optically active layer 230) would then be a rare-earth doped fluoride (e.g., erbium-doped fluoride) or a rare-earth doped silicon dioxide with fluorine.

In other alternative embodiments of the invention, more than one dopant is used to provide optically active atoms. For example, in an embodiment of the invention, optically active layer 230 includes Si nanocrystals in close proximity to atoms of both erbium (Z=68) and thulium (Z=69). In yet other alternative embodiments of the invention, optically active layer 230 includes Si nanocrystals in close proximity to atoms of both erbium (Z=68) and yttrium (Z=70). In an embodiment of the invention, optically active layer 230 is co-doped with thulium (Z=69) and holmium (Z=67). In yet a further alternative embodiment of the invention, optically active layer 230 is co-doped with $Tm^-$(Z=69), $Ho^-$(Z=67), and $Eu^-$(Z=63). The term co-doped refers to a layer or region that is doped with more than one dopant.

Standard CMOS techniques such as chemical vapor deposition (CVD) of Si rich $SiO_2$, and/or ion implantation, and/or sputter deposition of Si-doped $SiO_2$ may be used to form optically active layer 230. A thin layer of $SiO_x$ may be converted into Si nanocrystals using a high temperature (e.g., 1100 degrees Celsius) anneal, for example, for a period of from five to thirty minutes. High temperature annealing has been shown to produce Si nanocrystals with a tight size distribution within the range of two to five nanometers.

In some embodiments of the invention, optically active layer 230 may be deposited between two layers of $SiO_2$ (e.g., dielectric layers 220 and 250). The layers of $SiO_2$ have a lower index of refraction thereby confining the light to a region with silicon nanocrystals. Dielectric layers 220 and 250 may be formed using standard CMOS techniques such as CVD and/or thermal oxidation, in an embodiment of the invention.

Optical cavity 240 provides a means to enhance the light emitted from optically active layer 230. The term optical cavity refers to creating a cavity that confines the light to amplify it. This can be done by, for example, enclosing an optically active region with reflective surfaces to (at least partially) contain oscillating electromagnetic fields. In the embodiment illustrated in FIG. 2, optical cavity 240 is formed by creating a ridge waveguide structure in dielectric layer 250 and/or optically active layer 230 with a distributed Bragg grating at each end of the waveguide. The distributed Bragg reflector structure may be etched using lithography and dry etching techniques into dielectric layer 250 and/or optically active layer 230.

In an embodiment of the invention, optically active layer 230 emits light having a wavelength λ. Grating teeth 256 and 258 may form a Bragg reflector by being spaced with a period of λ/2, in an embodiment of the invention. A distributed Bragg reflector refers to a waveguide section that provides constructive interference of radiation that is backscattered from the reflecting surfaces. Bragg reflectors are well-known to those of ordinary skill in the art and will not be further described except as to how they relate to embodiments of the invention.

Figure 3:
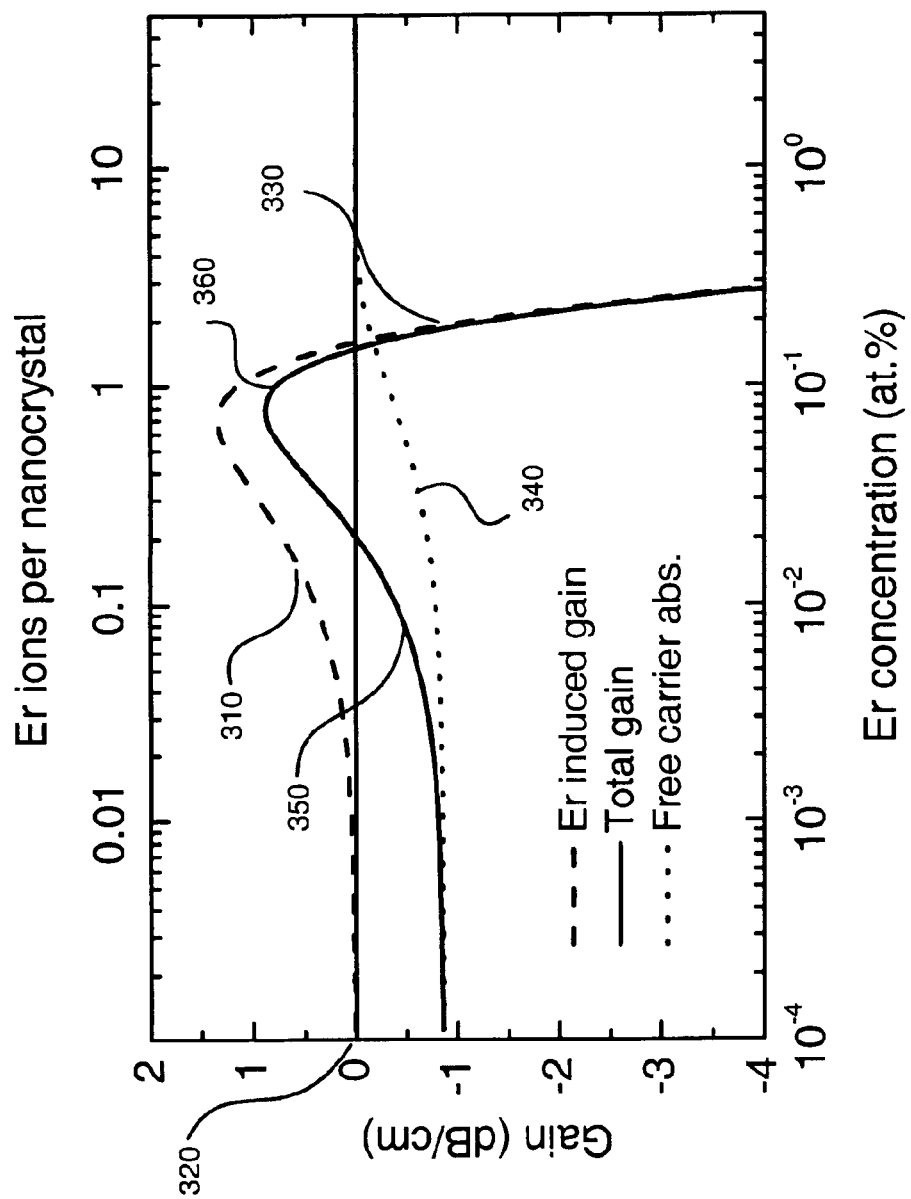
FIG. 3 is a logarithmic graph illustrating calculated optical gain versus Er concentration or alternatively calculated optical gain versus the ratio of Er ions to Si nanocrystals.

FIG. 3 is a logarithmic graph illustrating calculated optical gain versus Er concentration or alternatively calculated optical gain versus the ratio of Er ions to Si nanocrystals. Dashed line 310 shows the contribution to optical gain due to the Er ions in an optically active layer (e.g., layer 230, shown in FIG. 2). For example, as shown by reference numeral 320, at a concentration of 0.1 at. %, on average each 1000-atom nanocrystal may be near 1 Er ion. Referring to reference numeral 330, as the concentration approaches 1 Er ion per Si nanocrystal, the maximum excitable Er concentration may be exceeded for some Si nanocrystals.

Dotted line 340 shows the contribution to optical gain of absorption by excitons in Si nanocrystals that are not coupled to Er. As the Er concentration increases, the likelihood that a Si nanocrystal will be coupled to an Er ion similarly increases. Solid line 350 shows the sum of the two gain contributions. As shown by reference numeral 360, net optical gain can be achieved in an Er concentration range around 1 at. % or 1 ion per Si nanocrystal. While optical gain plot 300 is calculated based on using Er as the optically active element, a person of ordinary skill in the art will appreciate that similar gain plots based on alternative optically-active elements (e.g., other rare earth elements) may be calculated.

Figure 4:
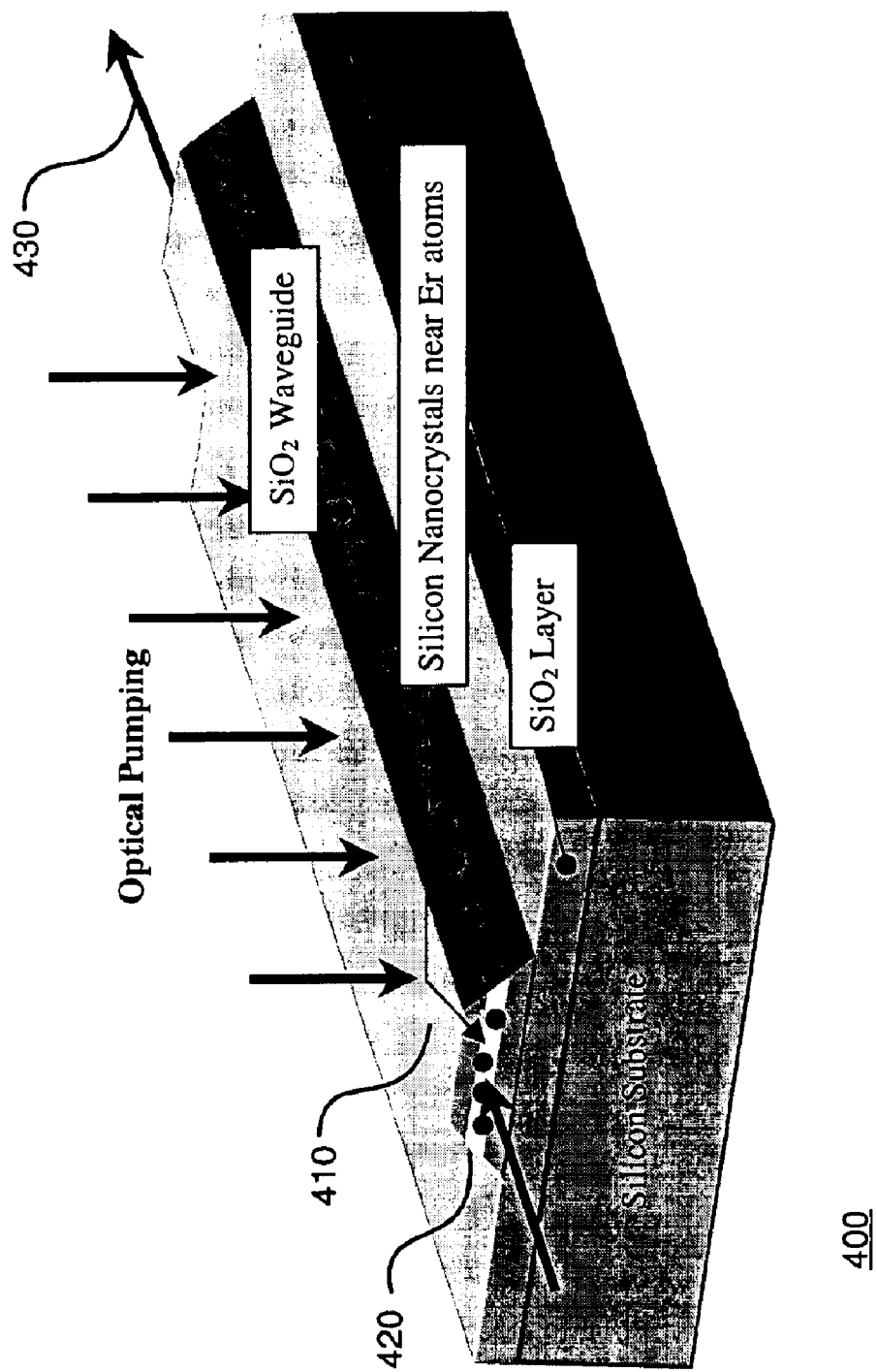
FIG. 4 illustrates light-emitting device 400, implemented according to an embodiment of the invention employing optical pumping

FIG. 4 illustrates light-emitting device 400, implemented according to an embodiment of the invention employing optical pumping. An optical source (e.g., a low cost LED) directs photons onto a top surface of waveguide 410, in an embodiment of the invention. Optically active layer 420 contains Si nanocrystals in close proximity to atoms of an optically active element (e.g., Er, Pr, Ho, Yb, Ce, Tm, etc.). An optical cavity (not shown) reflects the light emitted from optically active layer 420. The reflected light travels through waveguide 410, as shown by reference numeral 430.

Figure 5:
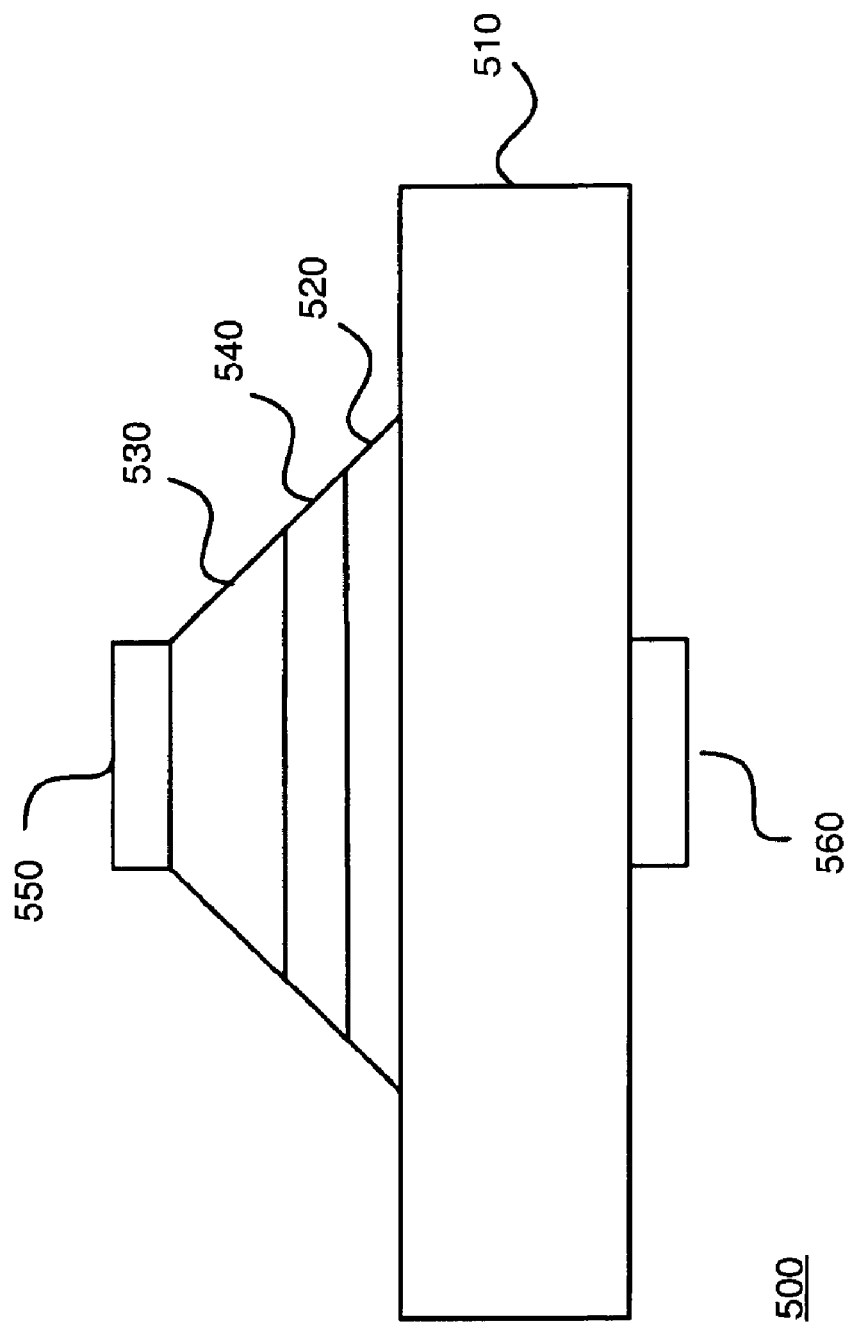
FIG. 5 is an illustration of light-emitting device 500, implemented according to an embodiment of the invention employing electrical excitation.

FIG. 5 is an illustration of light-emitting device 500, implemented according to an embodiment of the invention employing electrical excitation. Light-emitting device 500 includes substrate 510, dielectric layers 520 and 530, and optically active layer 540, in an embodiment of the invention. In addition, light-emitting device 500 includes electrical contacts 550 and 560. Electrical contacts 550 and 560 are used to electrically excite optically active layer 540, in an embodiment of the invention. For example, an electrical signal may be coupled to light-emitting device 500 using electrical contacts 550 and 560. The electrical signal may excite optically active layer 540 causing it to emit light. The light is reflected by an optical cavity (not shown) in an embodiment of the invention. The reflected light may travel through optically active layer 540 in a direction that is perpendicular to the perspective of light-emitting device 500 that is shown in FIG. 5.

Figure 6:
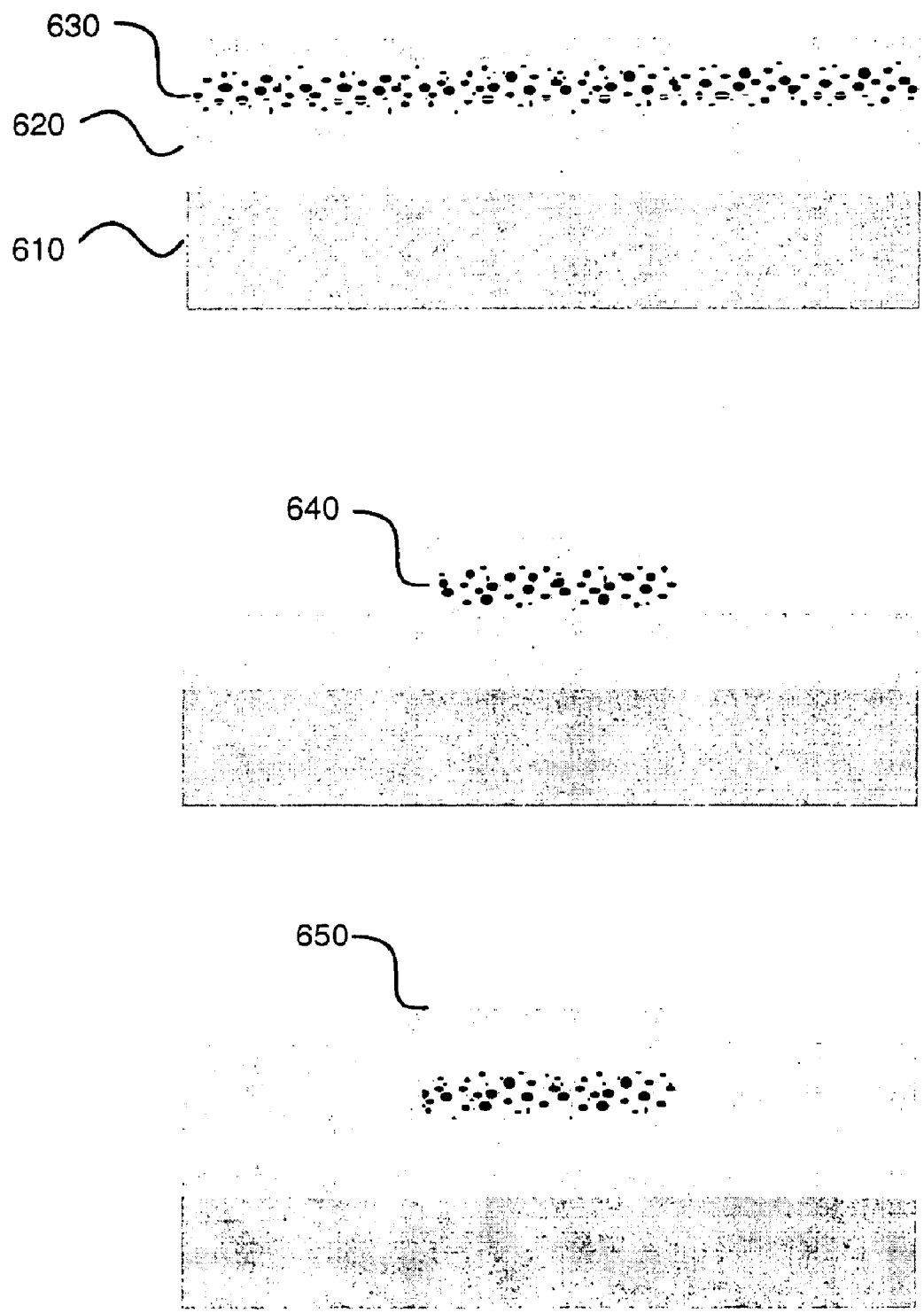
FIG. 6 illustrates the fabrication of a waveguide (including an optically active layer), according to an embodiment of the invention.

FIG. 6 illustrates the fabrication of a waveguide (including an optically active layer), according to an embodiment of the invention. Substrate 610, made of a semiconductor material, is provided at reference numeral 610. Dielectric layer 620 is formed on an upper surface of substrate 610, in an embodiment of the invention. Dielectric layer 620 may be formed by standard CMOS techniques such as CVD and/or thermal oxidation, in an embodiment of the invention.

Optically active layer 630 may be formed by depositing a thin layer of Si rich $SiO_x$ on an upper surface of dielectric layer 620, in an embodiment of the invention. Optically active layer 630 may be deposited by standard CMOS techniques such as CVD, ion implantation, and/or sputter deposition. The thin film of $SiO_x$ is converted into Si nanocrystals using a high temperature (e.g., 1100 degrees Celsius) anneal, in an embodiment of the invention.

Waveguide 640 is etched using lithography and dry etching, in an embodiment of the invention. An optical cavity (not shown) may be formed by etching a distributed Bragg reflector at each end of a waveguide structure on an upper surface of waveguide 640. Dielectric layer 650 is formed on top of waveguide 640, in an embodiment of the invention. Dielectric layer 650, in an embodiment of the invention, may reduce the light scattering losses from optically active layer 630.

Figure 7:
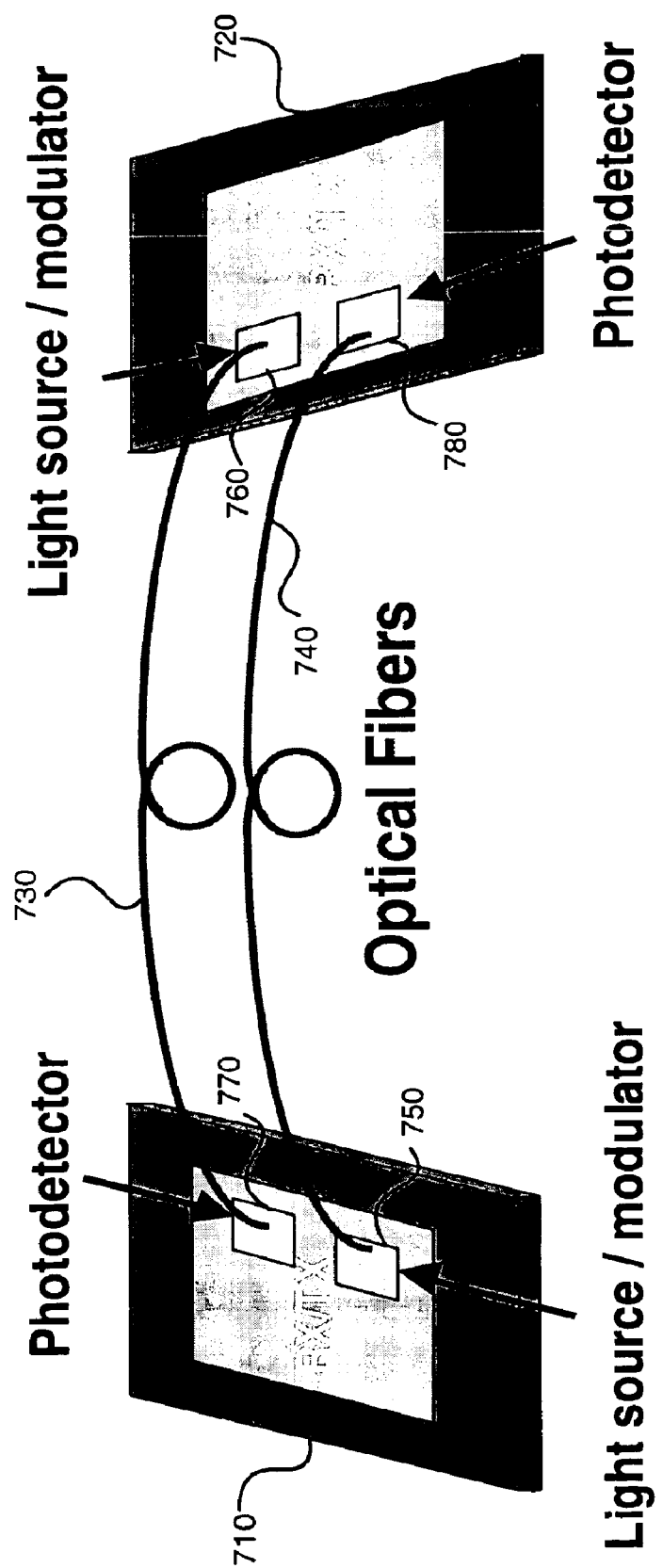
FIG. 7 is a plan view of a chip-to-chip communication system 700, implemented according to an embodiment of the invention.

FIG. 7 is a plan view of a chip-to-chip communication system 700, implemented according to an embodiment of the invention. Chip-to-chip communication system 700 includes IC chips 710 and 720, optical fibers 730 and 740, light-emitting devices 750 and 760, as well as photodetectors 770 and 780. Photodetectors 770 and 780 represent a broad range of devices that detect incoming light and, in some cases, convert the detected light into electrical signals. The use of Si, Ge, or SiGe for the photodetector is desired to make a monolithic solution. Germanium is limited in its sensitivity to wavelengths shorter than approximately 1.55 μm, the very wavelength emitted by Erbium. It is for this reason that other rare earth elements (or compounds containing rare earth elements) are preferred. Optical fibers and photodetectors are well-known by those of ordinary skill in the art and will not be further described except as to how they relate to embodiments of the invention. While the illustrated embodiment shows optical fibers connecting IC chip 710 and IC chip 720, a person of ordinary skill in the art will appreciate that a wide range of optical pathways may be used to couple light between the chips. In addition, other optical elements besides photodetectors may be used in a sub-system. Light-emitting devices 750 and 760 may have a structure substantially similar to light-emitting device 200, shown in FIG. 2, in an embodiment of the invention.

IC chip 710 may excite light-emitting device 750 using an optical source (e.g., an LED) or an electrical source (e.g., electrical leads). The emitted light may be modulated so that the modulated light conveys digital or analog information from IC chip 710. The modulated light may be coupled to optical fiber 740. Optical fiber 740 transports the modulated light to photodetector 780. Photodetector 780 converts the modulated light into an electrical signal for use by IC chip 720, in an embodiment of the invention.

Figure 8:
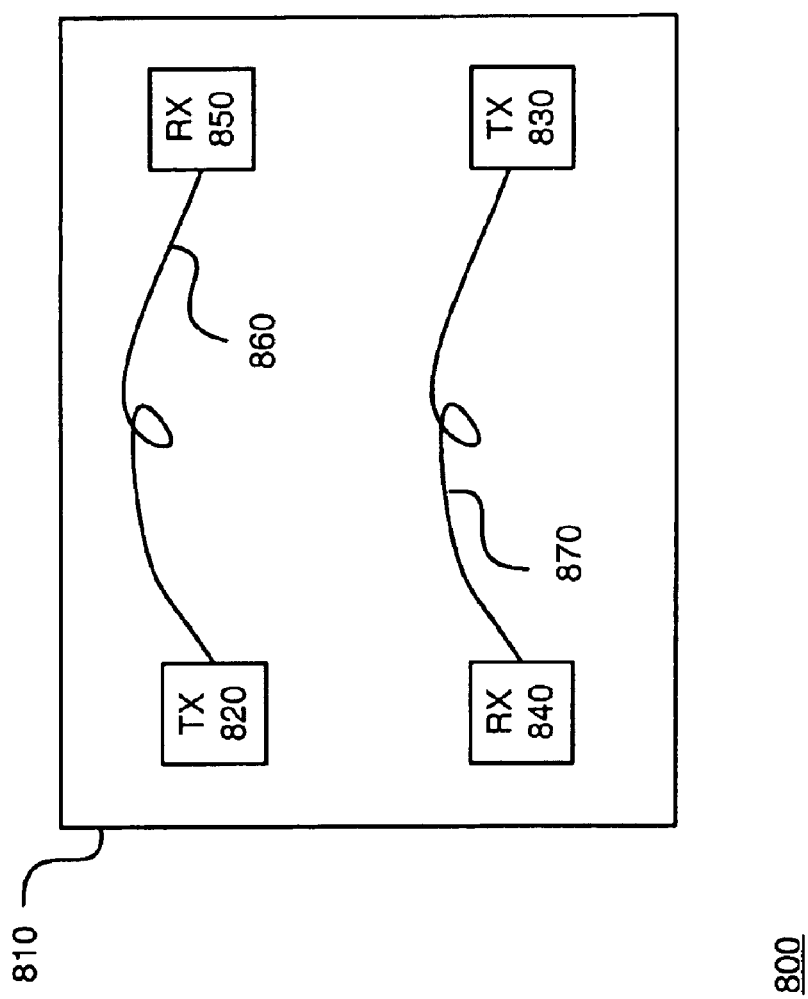
FIG. 8 is a block diagram of on-chip communication system 800, implemented according to an embodiment of the invention.

FIG. 8 is a block diagram of on-chip communication system 800, implemented according to an embodiment of the invention. On-chip communication system 800 includes IC chip 810 with light-emitting devices 820 and 830 fabricated on the same substrate as other elements of IC chip 810. In an embodiment of the invention, light-emitting devices 820 and 830 may each include an optically active layer composed of Si nanocrystals doped with a rare earth element (e.g., layer 230, shown in FIG. 2) and an optical cavity (e.g., optical cavity 240, shown in FIG. 2).

Light-emitting devices 820 and 830 are respectively in optical communication with photodetectors 850 and 840 via optical pathways 860 and 870. In an embodiment of the invention, optical pathways 860 and 870 are optical fibers. In alternative embodiments of the invention, optical pathways 860 and 870 are optical waveguides that are fabricated on the same substrate as IC chip 810.

IC chip 810 transports digital and/or analog encoded information via communication system 800. In one embodiment of the invention, light-emitting device 820 is optically pumped by a source (e.g., a low cost LED), which causes device 820 to emit light. In alternative embodiments of the invention, light-emitting device may be electrically excited. The emitted light may be modulated so that it carries information. The modulated light is then transported to photodetector 850 via optical pathway 860. In an embodiment of the invention, photodetector 850 converts the modulated light to an electrical signal for further processing by IC chip 810.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A light-emitting device comprising:
   a substrate formed from a semiconductor material;
   a dielectric layer formed on an upper surface of the substrate;
   an optically active layer including Si nanocrystals, the optically active layer doped with a rare earth element and formed in the dielectric layer; and
   an optical cavity in optical communication with the optically active layer.

2. The light-emitting device of claim 1, wherein the optical cavity comprises another dielectric layer deposited on an upper surface of the optically active layer, the other dielectric layer having spaced apart grating teeth to reflect light emitted from the optically active layer.

3. The light-emitting device of claim 2, wherein the other dielectric layer having spaced apart grating teeth comprises a dielectric material with a refractive index different than a refractive index of the optically active layer.

4. The light-emitting device of claim 2, wherein the optically active layer is capable of emitting light at a wavelength; and
   wherein the other dielectric layer having spaced apart grating teeth to reflect light emitted from the optically active layer comprises a first grating tooth separated from a second grating tooth with a period of one-half the wavelength.

5. The light-emitting device of claim 4, wherein the other dielectric layer having spaced apart grating teeth to reflect light, comprises a third grating tooth separated from the first grating tooth with a period of one wavelength the wavelength and external to a region between the first grating tooth and the second grating tooth.

6. The light-emitting device of claim 1, wherein the substrate formed from a semiconductor material comprises a substrate formed from silicon.

7. The light-emitting device of claim 1, wherein the substrate formed from a semiconductor material comprises a substrate formed from SiGe.

8. The light-emitting device of claim 1, wherein the dielectric layer formed on an upper surface of the substrate comprises a layer of fluoride.

9. The light-emitting device of claim 1, wherein the dielectric layer formed on an upper surface of the substrate comprises a layer of $SiO_2$ dope with fluorine.

10. The light-emitting device of claim 1, wherein the optically active layer including Si nanocrystals is doped with praseodymium.

11. The light-emitting device of claim 10, wherein the optically active layer is capable of emitting light having a wavelength of 1.3 µm.

12. The light-emitting device of claim 1, wherein the optically active layer including Si nanocrystals is doped with holmium.

13. The light-emitting device of claim 12, wherein the optically active layer is capable of emitting light having a wavelength of 1.2 µm.

14. The light-emitting device of claim 1, wherein the optically active layer including Si nanocrystals is doped with ytterbium.

15. The light-emitting device of claim 14, wherein the optically active layer is capable of emitting light having a wavelength of 980 µm.

16. The light-emitting device of claim 1, wherein the optically active layer including Si nanocrystals is doped with cerium.

17. The light-emitting device of claim 16, wherein the optically active layer is capable of emitting light having a wavelength of 620 µm.

18. The light-emitting device of claim 1, wherein the optically active layer including Si nanocrystals is doped with thulium.

19. The light-emitting device of claim 18, wherein the optically active layer is capable of emitting light having a wavelength of 1.4 µm.

20. The light-emitting device of claim 1, wherein the optically active layer doped with a rare earth element comprises an optically active layer co-dope with atoms of two or more dopants, wherein one of the two or more dopants is a rare earth element.

21. The light-emitting device of claim 1, wherein the optical cavity comprises spaced apart grating teeth etched into the optically active layer.

22. The light-emitting device of claim 1, further comprising: a first conducting contact in electrical communication with a side of the optically active layer; and
   a second conducting contact in electrical communication with an other side of the optically active layer, wherein the first conducting contact and the second conducting contact are capable of electrically exciting the optically active layer.

23. The light-emitting device of claim 1, further comprising:
   a modulator in optical communication with the optical cavity to optically modulate light emitted from the optically active layer.

24. The light-emitting device of claim 1, wherein the optically active layer doped with a rare earth element comprises an optically active layer doped with a compound involving a rare earth element.

25. A method of forming a light-emitting device comprising:
   providing a substrate made of a semiconductor material;
   forming a dielectric layer on an upper surface of the substrate;
   forming an optically active layer on an upper surface of the dielectric layer, the optically active layer including Si nanocrystals doped with a rare earth element; and
   forming an optical cavity on an upper surface of the optically active layer to reflect light from the optically active layer.

26. The method of claim 25, wherein forming the optical cavity on an upper surface of the optically active layer to reflect light emitted from the optically active layer comprises:
   depositing another dielectric layer on an upper surface of the optically active layer; and
   etching a first set of grating teeth and a second set of grating teeth into the other dielectric layer to provide a first reflecting surface and a second reflecting surface to reflect light emitted from the optically active layer.

27. The method of claim 25, wherein forming an optically active layer on an upper surface of the dielectric layer comprises:
   depositing a layer of $SiO_2$ on an upper surface of the dielectric layer;
   annealing the deposited layer to form Si nanocrystals; and
   implanting atoms of a rare earth element in the layer of Si nanocrystals with ion implantation.

28. The method of claim 27, wherein implanting atoms of a rare earth element comprises implanting atoms of praseodymium in the layer of Si nanocrystals.

29. The method of claim 27, wherein implanting atoms of a rare earth element comprises implanting atoms of holmium in the layer of Si nanocrystals.

30. The method of claim 27, wherein implanting atoms of a rare earth element comprises implanting atoms of ytterbium in the layer of Si nanocrystals.

31. The method of claim 27, wherein implanting atoms of a rare earth element comprises implanting atoms of cerium in the layer of Si nanocrystal.

32. The method of claim 27, wherein implanting atoms of a rare earth element comprises implanting atoms of thulium in the layer of Si nanocrystals.

* * * * *

UNITED STATES PATENT AND TRADEMARK OFFICE
CERTIFICATE OF CORRECTION

| | |
|---|---|
| PATENT NO. | : 7,095,058 B2 |
| APPLICATION NO. | : 10/393643 |
| DATED | : August 22, 2006 |
| INVENTOR(S) | : Gardner |

Page 1 of 1

It is certified that error appears in the above-identified patent and that said Letters Patent is hereby corrected as shown below:

In column 8, at line 13, delete "co-dope" and insert --co-doped--.
In column 10, at line 3, delete "nanocrystal." and insert --nanocrystals.--.

Signed and Sealed this

Sixth Day of November, 2007

JON W. DUDAS
*Director of the United States Patent and Trademark Office*